US005678968A

United States Patent [19]

Bourgeois et al.

[11] Patent Number: 5,678,968
[45] Date of Patent: Oct. 21, 1997

[54] HONEYCOMB ROLL SPACER

[75] Inventors: David F. Bourgeois, Roscoe, Ill.; Reuben C. Carder, Michigan City, Ind.

[73] Assignee: Hexacomb Corporation, Lincolnshire, Ill.

[21] Appl. No.: 497,947

[22] Filed: Jul. 3, 1995

[51] Int. Cl.⁶ .................................................. B60P 7/135
[52] U.S. Cl. ........................ 410/119; 410/125; 410/117; 410/154; 206/522; 206/593; 206/592
[58] Field of Search .......................... 410/117, 119, 410/121, 154, 125, 155, 118; 206/522, 592, 593; 428/73, 118

[56] References Cited

U.S. PATENT DOCUMENTS

| 1,808,651 | 6/1931  | Gibb et al. |         |
|-----------|---------|-------------|---------|
| 2,662,638 | 12/1953 | Storer et al. |       |
| 2,704,587 | 3/1955  | Pajak       | 428/118 |
| 2,728,479 | 12/1955 | Wheeler     |         |
| 3,028,981 | 4/1962  | Ford et al. | 410/117 |
| 3,403,780 | 10/1968 | Binkley et al. |      |
| 3,405,659 | 10/1968 | Hees        | 410/154 |
| 3,481,813 | 12/1969 | Wiggers     |         |
| 3,708,084 | 1/1973  | Bixler et al. |       |
| 3,890,108 | 6/1975  | Welsh       |         |
| 3,900,675 | 8/1975  | Morgan      | 428/43 X |
| 3,910,485 | 10/1975 | Wandel      |         |
| 3,987,736 | 10/1976 | Miller      | 410/119 |
| 4,033,455 | 7/1977  | Robison     |         |
| 4,067,442 | 1/1978  | Howe        |         |
| 4,142,634 | 3/1979  | Leff et al. |         |
| 4,195,732 | 4/1980  | Bell        |         |
| 4,553,887 | 11/1985 | Reeves      | 410/119 |
| 4,572,716 | 2/1986  | West        | 410/36  |
| 4,585,381 | 4/1986  | Boyse       | 410/154 |
| 4,596,541 | 6/1986  | Ward, Sr. et al. |   |
| 4,667,823 | 5/1987  | Wolfe, Jr. et al. |  |
| 4,854,792 | 8/1989  | Cottone     | 410/121 X |
| 4,883,179 | 11/1989 | Dionne      |         |
| 5,175,041 | 12/1992 | Webb et al. |         |

FOREIGN PATENT DOCUMENTS

| 2835219  | 2/1980  | Germany | 410/154 |
| 61-60335 | 3/1986  | Japan   | 410/119 |
| 94/27814 | 12/1994 | WIPO    |         |

OTHER PUBLICATIONS

1988 International Honeycomb Corporation brochure entitled "Honeycomb Packing System Keeps Round Rolls Round".
Honeycomb Structural Products, Inc. brochure entitled "Product Bulletin".
International Honeycomb brochure entitled "Inner Packaging".
Henry Molded Products, Inc. brochure entitled "Stakker Roll Packaging System".
Great Northern Corporation brochure entitled "Rollguard A New Packaging System".
1988 International Honeycomb Sketches.

*Primary Examiner*—Karen B. Merritt
*Assistant Examiner*—Stephen Gordon
*Attorney, Agent, or Firm*—Arnold, White & Durkee

[57] ABSTRACT

A spacer is provided for supporting and cushioning a roll of web material during shipment comprising a pad including a honeycomb core sandwiched between opposite face sheets. The pad includes a curved recess formed therein which is conformed to receive and cushion the rolls of web material. The recess is defined by a portion of the pad in which the honeycomb core and one of the face sheets has been compressively deformed to a predetermined depth. The face sheet which is compressively deformed includes an elongate slit located in the region overlying the recess for preventing the tearing of the face sheet when the pad is compressively deformed.

27 Claims, 4 Drawing Sheets

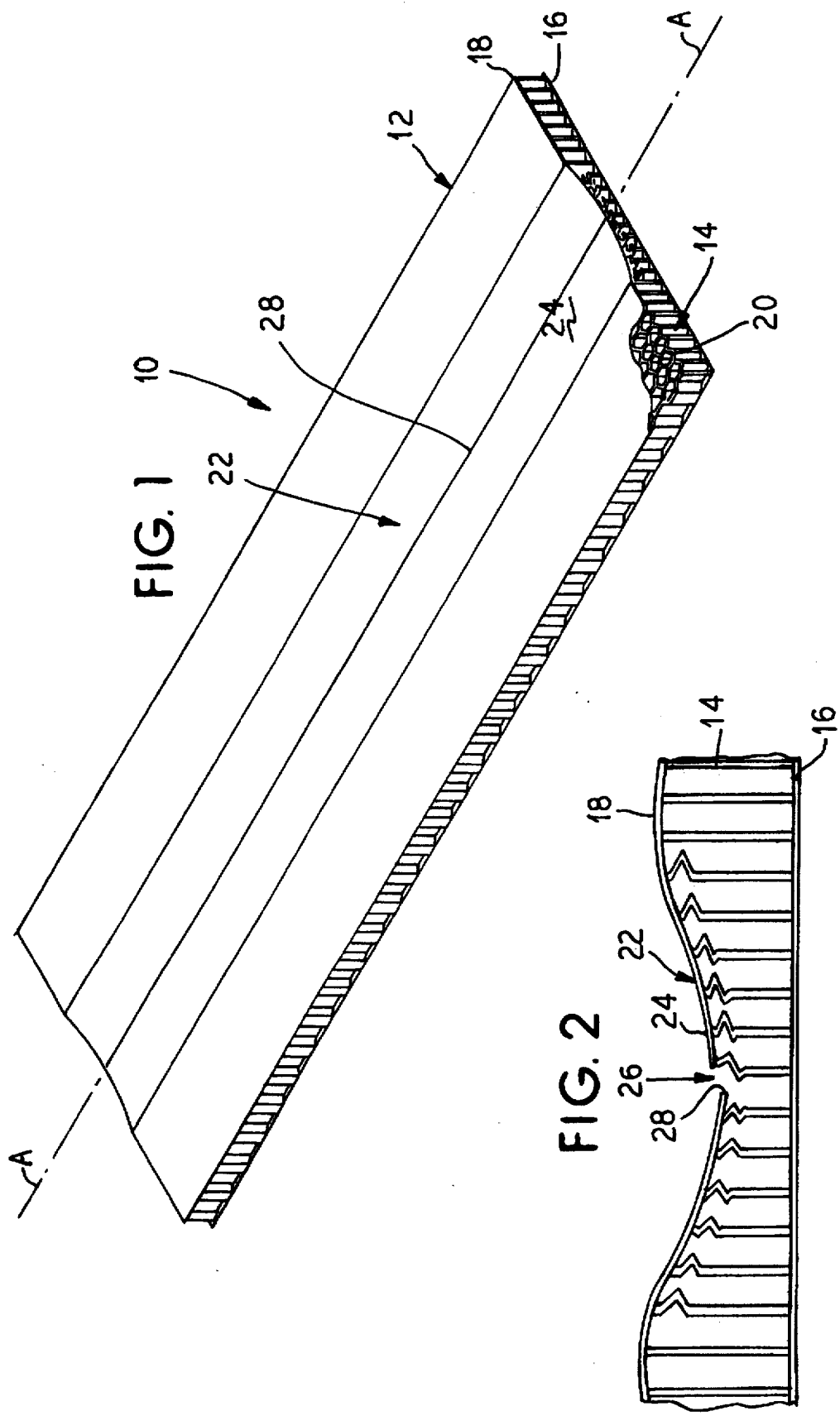

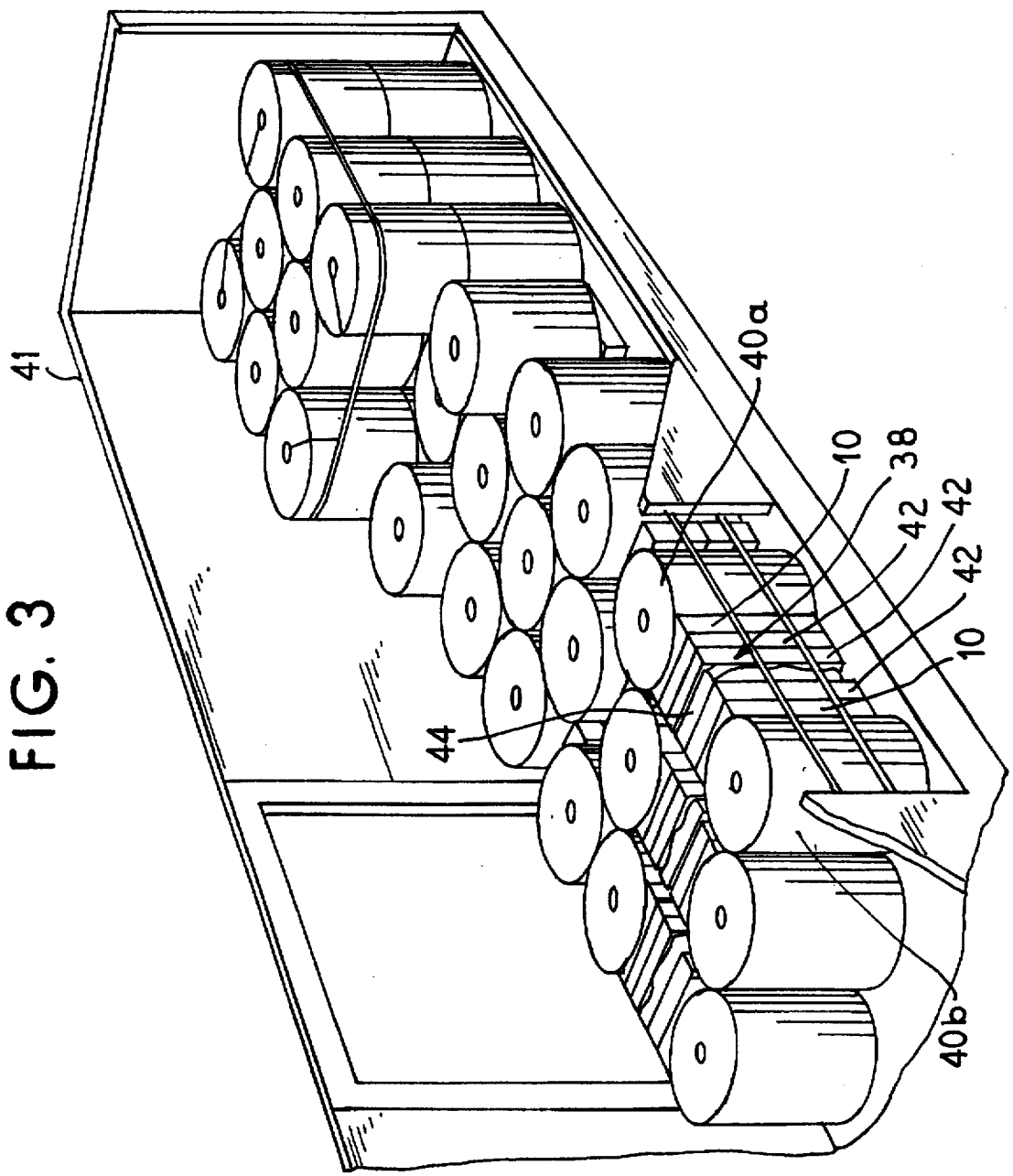

HONEYCOMB ROLL SPACER

TECHNICAL FIELD

This invention relates generally to a honeycomb spacer for supporting and cushioning a roll of web material during shipment and, more particularly to an improved honeycomb spacer that includes an elongate slitted recess that is defined by compressively deformed honeycomb material.

BACKGROUND OF THE INVENTION

Web material such as paper has been stored in rolls which, when transported by truck, rail, or other means of transportation, have a tendency to move and become abraised, pierced, and cut as a result of roll movement and roll load shifts during transport.

To secure and avoid damage to the rolls of web material during transport, the prior art has employed spacers positioned between the rolls for supporting and cushioning the rolls. U.S. Pat. No. 4,572,716 to West discloses a device for fixing the position of rolls of web material during shipment that includes a spacer housing a flat honeycomb support pad and opposite angled honeycomb open cell contact pads attached to a support pad for engaging and supporting vertically stacked rolls of web material.

One disadvantage associated with the West spacer is that it is made of two separate pads, i.e., a flat support pad and angled contact pads which must be manufactured separately and then attached together. Another disadvantage is the tendency for the open honeycomb cells of the angled contact pads to "grab" onto the web material during shipment and causing the tearing of the web. Yet a further disadvantage is the embossment of the web material on the rolls with the honeycomb pattern of the open cell contact pads.

U.S. Pat. No. 4,195,732 to Bell discloses another spacer embodiment comprising an elongated bar of expanded plastic foam including a plurality of identations adapted to receive a plurality of horizontally stacked rolls of web material. A disadvantage associated with this spacer is that it is made of plastic foam, i.e., a non-recyclable and non-biodegradable material.

What is needed is an improved honeycomb spacer which is recyclable and biodegradable and will not damage the rolls of web material during shipment. The spacer should be of unitary construction permitting ease of manufacture and use.

The present invention meets these desires and addresses the problems associated with the prior art spacers.

SUMMARY OF THE INVENTION

The present invention is a spacer for supporting and cushioning a roll of web material such as paper during shipment which comprises a pad including a honeycomb core sandwiched between opposite face sheets secured to the core. The pad is preferably made of recyclable biodegradable paper.

The pad includes a recess formed therein which is conformed to receive and cushion the roll of web material. The recess extends along the longitudinal axis of the pad and is defined by a portion of the pad in which the honeycomb core and one of the face sheets has been compressively deformed to a predetermined depth. This can be done by a longitudinally extending semi-elliptically shaped crushing element that is mounted to a die.

The compressively deformed face sheet includes a slit extending substantially the length of the pad co-linearly with the longitudinal axis of the pad and preferably centrally in the recess so as to prevent the tearing of the face sheet during compression.

The spacer is adapted to be used in an assembly for supporting and cushioning a plurality of rolls of web material vertically during shipment in a rail car or the like and can be used with an inflatable member positioned between two such spacers. The inflatable member contacts and exerts a force upon the spacers and upon the rolls of web material received in the recess of such spacers and upon other rolls in the rail car to provide a tight fit between all of the rolls to prevent damage to the rolls from movement during shipment.

According to the present invention, the compressed honeycomb which forms the recess advantageously provides a spring-like cushion for the rolls of web material and protects them from vibration, quick stops, and the rough jarring movements of railcar coupling without the break-up or crushing of either the rolls or the spacers.

Additionally, the compressed honeycomb advantageously absorbs some of the shock and force which is ordinarily fully transferred from the rolls to the inflatable member.

The use of a face sheet secured to the core of the pad eliminates certain of the disadvantages associated with the open honeycomb cell arrangement of prior art spacers such as the spacer disclosed in U.S. Pat. No. 4,572,716 to West. Initially, the face sheet prevents the web material on the rolls from being embossed with the honeycomb pattern of the pad. Additionally, the face sheet prevents the web material from being "grasped" by the open honeycomb cells during transport and thus eliminating the risk of tearing and abrasion of the web material during transport.

The spacer of the present invention, being made of kraft paper or the like, provides the advantage of being recyclable and biodegradable.

BRIEF DESCRIPTION OF THE DRAWINGS

In the accompanying drawings that form a portion of this disclosure:

FIG. 1 is a partially broken perspective view of a honeycomb spacer in accordance with the present invention;

FIG. 2 is an enlarged broken end view of the spacer of FIG. 1;

FIG. 3 is a perspective view depicting the spacer of FIG. 1 in use as one of the elements of an assembly for supporting and cushioning rolls of web material vertically during shipment in a rail car;

DESCRIPTION OF THE PREFERRED EMBODIMENT

Figure 4:
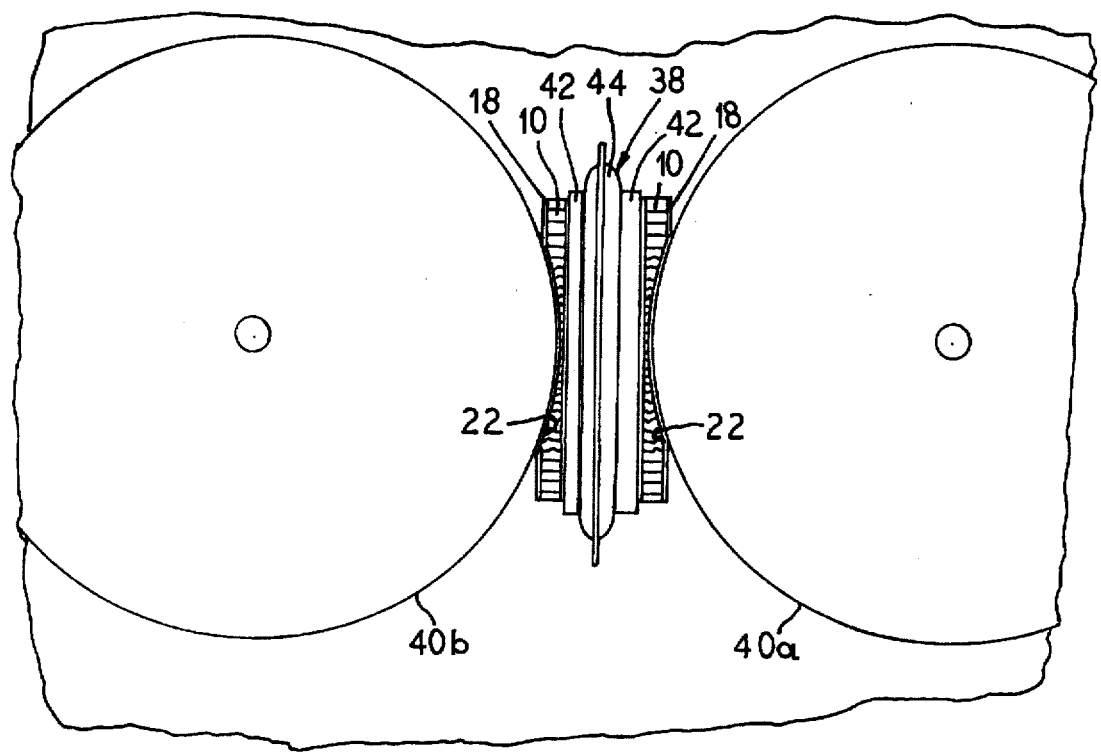
FIG. 4 is a plan view of one of the assemblies shown in FIG. 3.

FIG. 1 shows a spacer 10 constructed in accordance with the present invention. The spacer 10 comprises a substantially flat pad 12 of honeycomb material including a honeycomb core 14 which is sandwiched between face sheets 16 and 18 which are secured to opposite faces of core 14. The core 14 is comprised of a plurality of honeycomb cells 20 disposed generally perpendicularly to the face sheets 16 and 18. Preferably, the honeycomb core 14 and face sheets 16 and 18 are made of fully recyclable and biodegradable recycled kraft paper. Although FIG. 1 depicts an elongate, rectangularly shaped pad 12, the pad 12 may be in the shape of a square or any other desired shape.

A generally concavely shaped recess 22 is formed in the pad 12. The recess 22 extends the length of the pad 12 centrally along the longitudinal and central axis A of the pad. The recess 22 has a bottom concavely curved surface 24 including a centrally disposed elongate aperture 26 (FIG. 2) defined by a slit 28 that is cut into face sheet 18 and which extends the length of the recess 22 and the pad 12 along and co-linearly with the longitudinal axis A of pad 12. The slit 28 is preferably positioned centrally on the face sheet 18 in the region of the face sheet 18 overlying the bottom surface 24 of the recess 22. Although FIG. 1 depicts only one slit 28, it is understood that, if desired, additional slits may be cut into the face sheet 18 in the region of the recess 22.

Figure 5:
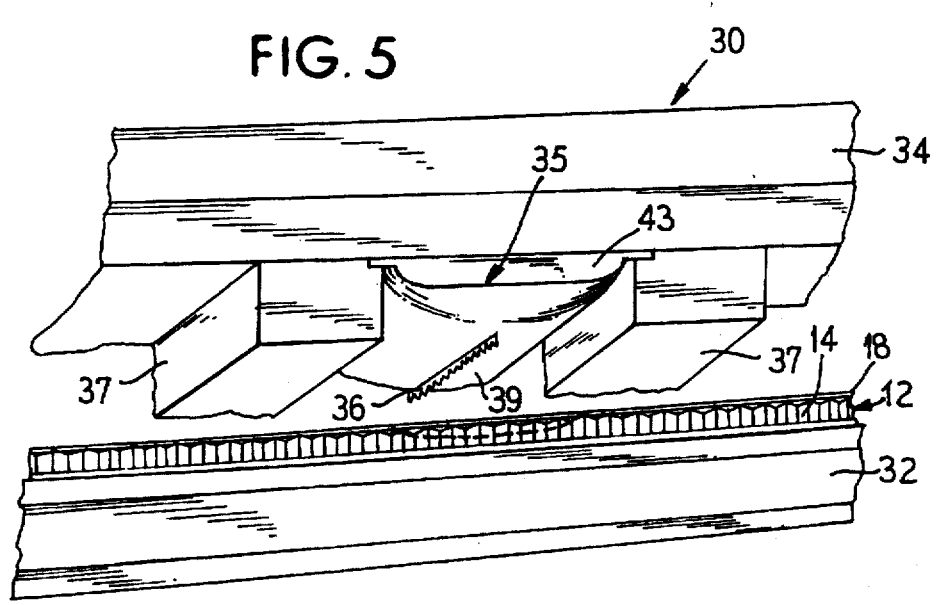
FIG. 5 is a simplified broken front perspective view of an apparatus for forming the recess and the slit in the spacer of FIG. 1.

Referring to FIG. 2, the recess 22 is defined by a central, longitudinal portion of the pad 12 in which the honeycomb core 14 and face sheet 18 have been compressively deformed to a predetermined depth using the die press 30 depicted in FIG. 5. The die press 30 includes a support table 32 on which pad 12 is seated and a crushing arm 34. The arm 34 includes a curved, semi-elliptically shaped longitudinally extending crushing element 35 secured thereto for compressively deforming the face sheet 18 and core 14 of pad 12 to a predetermined depth when the arm 34 is lowered into pad 12 to form the recess 22. The pad 12 is provided and seated on table 32 such that the longitudinal axis A thereof is positioned immediately below the center of crushing element 35.

Generally, the pad 12 as shown in FIG. 1 is between about 22 to 24 inches (56 to 60 cm) wide and 72 inches (180 cm) in length and the honeycomb core 14 therein is between about 2 to 3 inches (5 to 8 cm) thick. Recess 22 has a width which is preferably at least approximately five times greater than its depth. More particularly, recess 22 has a width of about 7 to 20 inches (18 to 50 cm) and preferably about 7 inches (18 cm) and a depth of about 0.5 to 1 inch (1.25 to 2.5 cm) and preferably about 1 inch (2.5 cm). Although these dimensions are preferable, it is understood that all of the dimensions, including the depth and width of the recess, may be modified to suit any particular application. As a result, the recess 22 may have a width anywhere between about one fifth the width of the pad 12 to a width which is substantially the entire width of the pad 12 thus allowing the spacer 10 to accommodate any size roll of web material. The depth of the recess 22 may be anywhere between about one third the depth of the honeycomb core 14 to about two thirds the depth of the honeycomb core 14 depending upon the size and weight of the roll of web material intended to be cushioned by the spacer 10.

Figure 6:
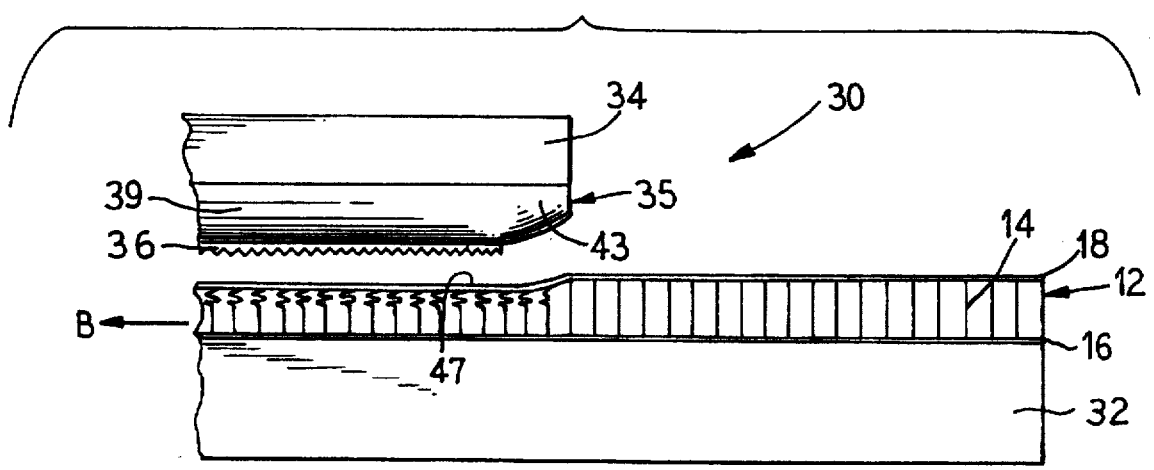
FIG. 6 is a simplified broken side elevational view of a portion of the apparatus shown in FIG. 5.

The crushing element 35, on the other hand, need only be approximately 48 to 60 inches (120 to 150 cm) in length to prepare a pad 72 inches in length. The recess 22 in pad 12 can then be formed in two strokes as depicted in FIG. 6. This allows the use of a crushing element 35 shorter in length than the pad 12 making it easier to store and use on pads of varying lengths.

Initially, and during the first stroke, the crushing element 35 is lowered into pad 12 to compressively deform a first longitudinal portion of face sheet 18 and the core 14 to form a first longitudinal section 47 of the recess 22 which is approximately sixty inches (150 cm) in length as shown in FIG. 6. Thereafter, the arm 34 is raised as also shown in FIG. 6 and the pad 12, although not shown, is moved longitudinally rearwardly on the table 32 along the longitudinal axis A of pad 12 in the direction of arrow B. Then, and although not shown, the arm 34 is then lowered a second time into the pad 12 to compressively deform a second longitudinal portion of the pad 12 along the longitudinal axis A thereof and co-linearly with the first portion of the pad 12 to form a second longitudinal twelve inch (30 cm) section of the recess unitary with the first longitudinal sixty inch section 47 of the recess 22 to form the full length seventy two inch recess 22.

To avoid the risk of abrasion, piercing and cutting of the face sheet 18 which would necessarily occur, as a result of the first stroke, in the region of the face sheet 18 immediately forward and adjacent the forward end of crushing element 35, crushing element 35 has been provided with a longitudinally extending body portion 39 having a generally constant thickness and semi-elliptical cross-sectional area and a forward tapered end portion 43 of decreased thickness and decreased semi-elliptical cross-sectional area.

A knife 36 protrudes outwardly from and is mounted to the outer surface of the body portion 39. The knife 36 extends longitudinally along the length of element 35 and is positioned centrally on the body portion 39. One longitudinal edge of knife 36 is embedded in the outer surface of body portion 39 while the opposite edge of knife 36 protrudes outwardly from the outer surface of the body portion 39 and is serrated for cutting purposes. The pad 12 is provided and seated on the table 32 such that the longitudinal axis A thereof is positioned immediately below the knife 36 and co-planarly therewith. If desired, the knife 36 may also extend onto the tapered end portion 43.

The knife 36 allows for the cutting of the slit 28 in face sheet 18 simultaneously with the deformation of the face sheet 18 and core 14 so that the face sheet 18 is not cut or teared when the crushing element 35 is lowered into face sheet 18. Although not shown, it is understood that additional knives, spaced from and parallel to the knife 36, can be mounted to the body portion 39 where additional slits are desired in the region of the recess 22.

Preferably, the knife 36 is positioned in the body portion 39 so that the knife 36 cuts only the face sheet 18 and only a portion of the full thickness of the honeycomb core 14 beneath it. As a result, the pad 12 is rendered non-foldable and the opposite face sheet 16 remains substantially flat.

The arm 34 also includes a pair of compressible foam blocks 37 mounted thereon and positioned adjacent the crushing element 35. Blocks 37 compress when the arm 34 is lowered against the pad 12 and expand or spring back into their original shape when the arm 34 is raised.

Although not described herein, it is understood that the pad 12 may be conditioned prior to deformation as described in detail in PCT Publication No. WO 94/27814 published on Dec. 8, 1994 to make the pad 12 more compressible.

Referring to FIGS. 3 and 4, the spacer 10 is adapted for use in an assembly 38 for supporting and cushioning a plurality of vertically disposed rolls of web material 40 for shipment in a container such as rail car 41. The assembly 38 is comprised of two spacers 10, a plurality of honeycomb void fillers 42, and an inflatable member 44 such as an air bag.

In use, spacers 10 are inserted adjacent cylindrical rolls of web material 40a and 40b, respectively such that the cylindrical surface of rolls 40a and 40b are tightly received in and cushioned within the concave surface 24 of the recess 22 of opposing spacers 10. The air bag 44 is thereafter inserted between opposing spacers 10. One or more honeycomb fillers 42 may optionally be inserted between spacers 10 and air bag 42 to fill any remaining voids. For example, FIG. 3 depicts an assembly 38 including four fillers 42 while FIG. 4 depicts an assembly 38 including only two fillers 42. After the requisite number of fillers 42 have been inserted, the air bag 44 is then activated to apply a force to the fillers 42, spacers 10 and rolls 40a and 40b. The force is then transferred to the remaining rolls 40 to keep all of the rolls 40 in a tight fit during transport to eliminate the risk of abrasion, piercing, and cutting of any of the rolls.

Although not shown in FIG. 3, one of the spacers 10 can also be used between one of the rolls and the wall of the rail car. The spacers 10 can also be used without either fillers 42 or air bag 44.

According to the invention, the recess 22 is shaped to tightly receive and support the rolls 40a and 40b thus offering little chance for the rolls to move forward or side-to-side during shipment. The compressed honeycomb which forms the recess 22 advantageously provides a spring-like cushion for rolls 40a and 40b and protects them from vibration, quick stops, and the rough jarring movements of railcar coupling without the breakup or crushing of either the rolls 40a and 40b or the spacers 10. Additionally, the compressed honeycomb absorbs some of the shock and force which is ordinarily fully transferred from the rolls 40a and 40b to the air bag 44. As a result, the air bag 44 remains at or near its original pressure throughout the shipment thus assuring its optimal performance for the entire time of transport.

The use of a face sheet 18 secured to the core 14 of pad 12 eliminates certain of the disadvantages associated with the open honeycomb cell arrangement of prior art spacers such as the spacer disclosed in U.S. Pat. No. 4,572,716 to West. The face sheet 18 prevents the web material on rolls 40a and 40b from being embossed with the honeycomb pattern of the cells 20. The face sheet 18 also prevents the web material from being "grasped" by the open honeycomb cells during transport and thus eliminating the risk of tearing and abrasion of the web material during transport.

The foregoing is illustrative of the principles of the invention. Further, since numerous modifications and changes will readily occur to those skilled in the art, it is not desired to limit the invention to the exact construction and operation shown and described. Accordingly, all suitable modifications and equivalents may be resorted to while still falling within the scope of the invention.

What is claimed is:

1. A spacer for supporting and cushioning an elongate roll of web material during shipment comprising:
a substantially flat, non-foldable elongate pad including a honeycomb core and opposed first and second face sheets secured thereto, the pad including an elongate, wide recess including a generally concave surface for cooperatively receiving the elongate roll of web material, the recess being defined by a portion of the pad in which the honeycomb core and the first face sheet have been compressively deformed to a predetermined depth and width to cushion the elongate roll of web material received in the recess, the pad further including an elongate slit located in the recess and extending only through the first face sheet and a portion of the honeycomb core.

2. The spacer of claim 1 wherein the slit is located substantially centrally along the length of the recess.

3. The spacer of claim 1 wherein the pad includes a longitudinal axis along its length, the recess extending substantially the length of the pad and centrally thereon along the longitudinal axis, the slit in the first face sheet extending substantially the length of the pad co-linearly with the longitudinal axis of the pad.

4. The spacer of claim 1 wherein the honeycomb core is compressively deformed to a depth of between about one third to about two thirds the thickness of the honeycomb core.

5. The spacer of claim 1 wherein the width of the recess is greater than the depth of the recess.

6. The spacer of claim 1 wherein the width of the recess is at least approximately five times the depth of the recess.

7. The spacer of claim 1 wherein the recess has a width at least approximately one fifth the width of the pad.

8. The spacer of claim 1 wherein the pad is generally rectangular, the recess extending substantially the length and the width of the pad.

9. A spacer for supporting and cushioning a roll of web material during shipment comprising:
a pad having a length and width and including a honeycomb core and at least one face sheet secured to the honeycomb core, the at least one face sheeting having a slit, the pad including an elongate recess formed therein bridging the slit, the recess being generally concave along the width thereof, the recess being defined by a portion of the pad in which the honeycomb core and the at least one face sheet have been compressively deformed to a depth of between about one third to about two thirds of the thickness of the honeycomb core.

10. The spacer of claim 9 wherein the honeycomb core is compressively deformed to a depth of about one half the thickness of the honeycomb core.

11. The spacer of claim 9 further including a substantially flat face sheet secured to the honeycomb core opposite the at least one face sheet with the recess therein.

12. The spacer of claim 9 wherein the slit is located centrally along the length of the recess and extends only through the at least one face sheet.

13. The spacer of claim 9 wherein the pad is elongate and includes a longitudinal axis along its length, the recess extending substantially the length of the pad and centrally thereon along the longitudinal axis, the slit in the at least one face sheet extending substantially the length of the pad co-linearly with the longitudinal axis of the pad.

14. The spacer of claim 9 wherein the pad is generally rectangular, the recess extending substantially the length and the width of the pad.

15. The spacer of claim 9 wherein the width of the recess is greater than the depth of the recess.

16. The spacer of claim 9 wherein the width of the recess is at least approximately five times the depth of the recess.

17. The spacer of claim 9 wherein the recess has a width at least approximately one fifth the width of the pad.

18. In an assembly for supporting and cushioning rolls of web material during shipment including a pair of opposed roll spacers adapted to engage and cushion opposed rolls of web material and an inflatable member positioned between the roll spacers to contact and exert a force upon the roll spacers and upon the rolls of web material, each of the roll spacers comprising:
a substantially flat pad of honeycomb material sandwiched between opposite face sheets, the pad including an elongate, wide recess formed therein and conformed to receive and cushion the rolls of web material, the recess in each of the spacers being defined by a portion of the pad wherein the honeycomb material and one of the face sheets has been compressively deformed to a predetermined depth, the compressively deformed face sheet including an elongate slit located in the region thereof overlying the recess.

19. The assembly of claim 18 wherein the recess has a width at least approximately one fifth the width of the pad.

20. The assembly of claim 18 wherein the pad is generally rectangular, the recess extending substantially the length and the width of the pad.

21. The assembly of claim 18 wherein the honeycomb core is compressively deformed to a depth of between about one third to about two thirds the thickness of the honeycomb core.

22. The assembly of claim 18 wherein the slit is located substantially centrally along the length of the recess.

23. The assembly of claim 18 wherein the pad is elongate and includes a longitudinal axis, the recess extending substantially the length of the pad and centrally thereon along the longitudinal axis, the slit extending substantially the length of the pad co-linearly with the longitudinal axis of the pad.

24. The assembly of claim 18 wherein the recess is generally concave along its width.

25. The assembly of claim 18 wherein the width of the recess is greater than the depth of the recess.

26. The assembly of claim 18 wherein the width of the recess is at least approximately five times the depth of the recess.

27. An assembly for supporting and cushioning rolls of web material including a pair of opposed spacers and an inflatable member positioned between the opposed spacers to contact and exert a force upon the spacers and the rolls of web material, each of the spacers comprising a substantially flat, non-foldable pad including a honeycomb core and at least one face sheet secured thereto, the pad including an elongate, wide recess formed therein and conformed to receive and cushion the roll of web material, the recess being defined by a portion of the pad in which the honeycomb core and the at least one face sheet have been compressively deformed to a predetermined depth and width, the compressively deformed at least one face sheet including an elongate slit located in the recess.

* * * * *